United States Patent
Cignetti et al.

(10) Patent No.: US 12,132,722 B1
(45) Date of Patent: Oct. 29, 2024

(54) CERTIFICATE MANAGEMENT SYSTEM WITH FORCED CERTIFICATE RENEWAL

(71) Applicant: Amazon Technologies, Inc., Seattle, WA (US)

(72) Inventors: Todd Cignetti, Ashburn, VA (US); Michael S. Slaughter, Seattle, WA (US); Dayong Hao, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 468 days.

(21) Appl. No.: 16/457,478

(22) Filed: Jun. 28, 2019

Related U.S. Application Data

(60) Provisional application No. 62/818,007, filed on Mar. 13, 2019.

(51) Int. Cl.
   *H04L 9/40* (2022.01)

(52) U.S. Cl.
   CPC ........ *H04L 63/0823* (2013.01); *H04L 63/108* (2013.01); *H04L 63/164* (2013.01)

(58) Field of Classification Search
   CPC . H04L 63/0823; H04L 63/108; H04L 63/164; H04L 9/3263; H04L 9/3268
   See application file for complete search history.

(56) References Cited

U.S. PATENT DOCUMENTS

| | | | |
|---|---|---|---|
| 7,707,406 B2 | 4/2010 | Qiu | |
| 8,015,600 B2 | 9/2011 | Sinn et al. | |
| 8,549,300 B1 * | 10/2013 | Kumar | H04L 9/3263 |
| | | | 713/168 |
| 8,738,901 B2 | 5/2014 | Fu et al. | |
| 9,215,232 B2 | 2/2015 | Fu et al. | |
| 9,130,758 B2 * | 9/2015 | Fu | H04L 63/0823 |
| 9,614,833 B1 | 4/2017 | Rao | |
| 9,912,646 B2 | 3/2018 | Kundu et al. | |
| 10,630,489 B2 * | 4/2020 | Hughes | H04L 9/3268 |

(Continued)

OTHER PUBLICATIONS

Randall Hunt, "AWS Certificate Manager Launches Private Certificate Authority," AWS News Blog, amazon.com, Apr. 2018, Source: https://aws.amazon.com/blogs/aws/aws-certificate-manager-launches-private-certificate-authority/, pp. 1-15.

(Continued)

*Primary Examiner* — Linglan Edwards
(74) *Attorney, Agent, or Firm* — Robert C. Kowert; Kowert, Hood, Munyon, Rankin & Goetzel, P.C.

(57) ABSTRACT

Methods, systems, and computer-readable media for a certificate management system with forced certificate renewal are disclosed. The certificate management system may receive a request to renew a digital certificate. The request may be received at a selected time prior to an automatic renewal date for the certificate, and the automatic renewal date may be stored by the certificate management system. The certificate management system may acquire, based at least in part on the request to renew the certificate, a renewed certificate from a certificate authority. The renewed certificate may be obtained prior to the automatic renewal date. The renewed certificate may be exported from the certificate management system and bound to a computing resource (e.g., a server) prior to the automatic renewal date.

18 Claims, 8 Drawing Sheets

(56) References Cited

U.S. PATENT DOCUMENTS

| | | | | |
|---|---|---|---|---|
| 10,666,637 B2* | 5/2020 | Cignetti | .............. | H04L 63/0823 |
| 10,771,261 B1* | 9/2020 | Lazar | .................... | H04L 9/3268 |
| 10,805,091 B2* | 10/2020 | Rai | ....................... | H04L 9/3268 |
| 11,888,997 B1* | 1/2024 | Bowen | ................... | H04L 9/3247 |
| 2011/0126001 A1* | 5/2011 | Fu | ....................... | H04L 63/0823 |
| | | | | 713/156 |
| 2012/0166796 A1* | 6/2012 | Metke | .................... | H04L 9/321 |
| | | | | 713/158 |
| 2013/0238895 A1* | 9/2013 | Dixon | ................. | H04L 63/0823 |
| | | | | 713/156 |
| 2015/0318996 A1* | 11/2015 | van Roermund | ..... | H04L 9/3268 |
| | | | | 713/158 |
| 2016/0057132 A1* | 2/2016 | Gibson | .............. | H04L 63/0442 |
| | | | | 713/156 |
| 2017/0026240 A1* | 1/2017 | Purusothaman | ...... | G06F 3/0484 |
| 2017/0093587 A1* | 3/2017 | Glisson | ................ | H04L 63/062 |
| 2017/0171191 A1* | 6/2017 | Cignetti | ................. | H04L 63/10 |
| 2020/0007348 A1* | 1/2020 | Kakutani | ............ | H04L 63/0823 |
| 2020/0021575 A1* | 1/2020 | Rezvani | ............... | H04L 63/083 |

OTHER PUBLICATIONS

Jeff Barr, "New—AWS Certificate Manager—Deploy SSL/TLS-Based Apps on AWS," AWS News Blog, amazon.com, Jan. 2016, Source: https://aws.amazon.com/blogs/aws/new-aws-certificate-manager-deploy-ssltls-based-apps-on-aws/, pp. 1-10.

* cited by examiner

CERTIFICATE MANAGEMENT SYSTEM WITH FORCED CERTIFICATE RENEWAL

This application claims benefit of priority to U.S. Provisional Application No. 62/818,007, filed Mar. 13, 2019 and titled "Certificate Management System with Forced Certificate Renewal," which is hereby incorporated by reference in its entirety.

BACKGROUND

Many companies and other organizations operate distributed systems that interconnect numerous computing systems and other computing resources to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. As the scale and scope of typical distributed systems has increased, the tasks of provisioning, administering, and managing the computing resources have become increasingly complicated.

Figure 1:
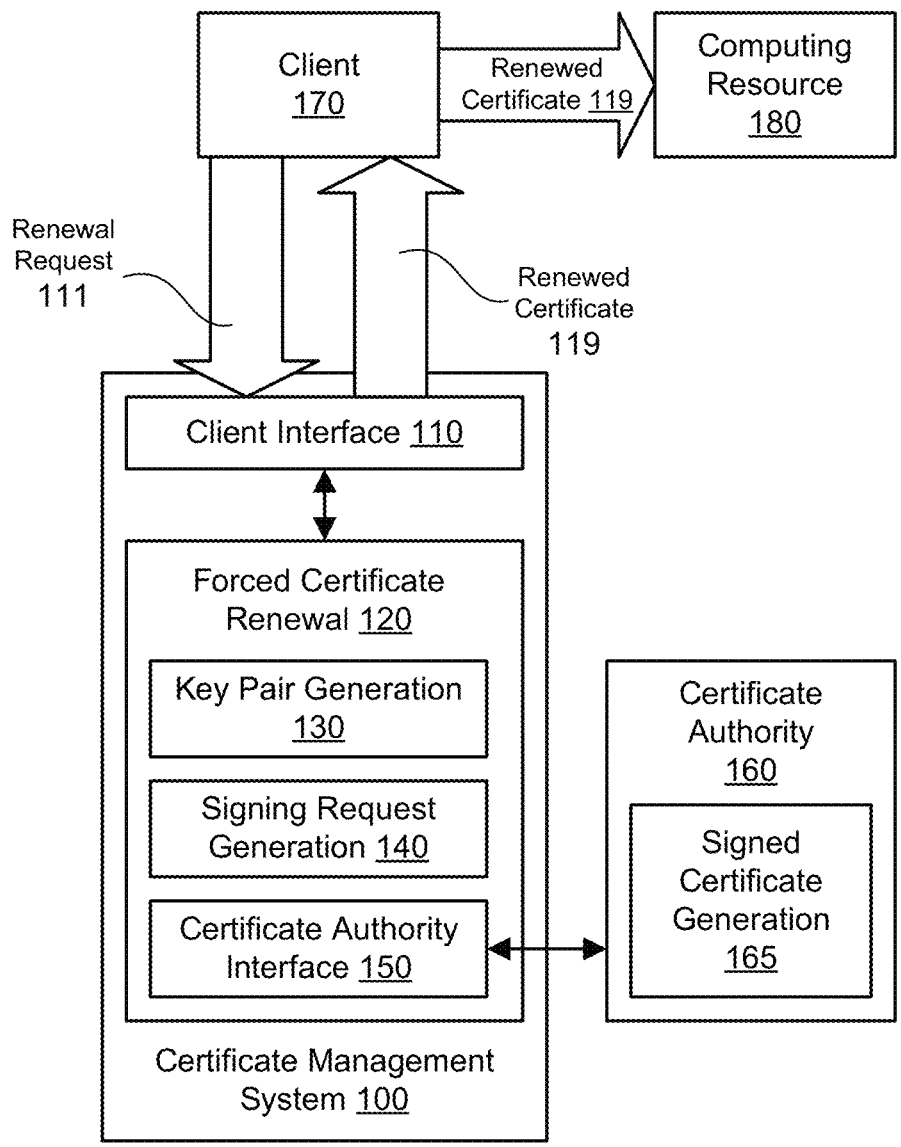
FIG. 1 illustrates an example system environment for a certificate management system with forced certificate renewal, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for a certificate management system with forced certificate renewal are described. A digital certificate may represent a certification by a certificate authority of ownership of a public key by a named subject of the certificate. When bound to a server or other network-accessible computing resource, the certificate may be used to create secure connections between the server and its clients. A digital certificate may have an expiration date after which the certificate cannot be used to create secure connections. Using prior approaches for certificate management, certificates were automatically renewed by a certificate manager according to an automatic renewal date or other expiration-based schedule. For example, a certificate manager may have automatically initiated renewal of a certificate shortly before the certificate was set to expire. Client-based logic may be used to export the renewed certificate from the certificate manager and bind the certificate to a server. However, such automatic, deadline-based renewal techniques may not yield sufficient time for testing and revising the client-based export and binding logic or for determining that the export and binding is performed as expected. Additionally, such automatic, deadline-based renewal techniques may result in certificate renewal at undesirable times, such as periods of heavy traffic for web servers. Using the techniques described herein, the renewal of digital certificates may be manually initiated at arbitrary or client-selected times to bypass the automatic renewal of those certificates according to their automatic renewal dates. Client-based software for processing certificate renewals may then be tested to verify the software's expected operation.

As one skilled in the art will appreciate in light of this disclosure, embodiments may be capable of achieving certain improvements to computer technology, including some or all of the following technical effects: (1) improving the security of servers and other network-accessible computing resources by facilitating the acquisition of digital certificates usable to create secure connections; (2) improving the performance of certificate export and binding by permitting extensive testing of client-based program code for export and binding prior to automatic certificate renewal; (3) improving the performance of servers and other network-accessible computing resources that rely on digital certificates by performing certificate renewal at arbitrary or client-selected times and prior to automatic certificate renewal; and so on.

FIG. 1 illustrates an example system environment for a certificate management system with forced certificate renewal, according to some embodiments. A certificate management system 100, also referred to as a certificate manager, may perform management of digital certificates on behalf of clients of the system. The certificate management system 100 may manage the lifecycles of private and public certificates on behalf of clients. As shown in FIG. 1, the system 100 may manage one or more digital certificates on behalf of a particular client 170. The client 170 may operate or otherwise be associated with a computing resource 180. The client 170 may represent one or more users including a developer or administrator of the computing resource 180. The computing resource 180 may represent a server, host, web server, application server, load balancer, containerized program, or another network-accessible or web-accessible computing entity. For example, the computing resource 180 may represent an Apache web server or NGINX web server that provides web pages to clients that connect to the server via a network (e.g., the Internet).

In one embodiment, in order to establish secure connections with clients using a secure protocol such as HTTPS, the computing resource 180 may require a properly issued and up-to-date digital certificate that is bound to the resource. In one embodiment, the digital certificate may be formatted according to the X.509 standard. The digital certificate may be issued by a certificate authority 160 that represents a trusted third party. The digital certificate may certify to clients of the resource 180 that a named subject of the certificate has ownership of a public key. The named subject may be an entity that offers the resource 180 to clients, and the name may identify a business entity that operates the resource. Clients of the resource 180 may reply upon the signature or on assertions made about a private key that corresponds to the certified public key.

The digital certificate bound to the computing resource 180 may have an expiration date. After the expiration date is reached, the certificate is deemed expired by clients of the resource and cannot be used to create secure connections. Using prior approaches for certificate management, certificates were automatically renewed by a certificate manager according to an automatic renewal date or other expiration-based schedule. For example, a certificate manager may have automatically initiated renewal of a certificate shortly before the certificate was set to expire. However, such automatic, deadline-based renewal techniques may result in certificate renewal at undesirable times, such as a period of heavy traffic for a web server, when the client 170 cannot afford the availability of the resource 180 to be restricted. To mitigate such problems, the certificate management system 100 may offer forced or manual certificate renewal 120. Using the forced certificate renewal 120, the renewal of a digital certificate may be manually initiated at an arbitrary or client-selected time and prior to the automatic renewal of the certificate according to its automatic renewal date. Client 170 may then test, debug, and improve their export and binding logic at arbitrary or client-selected times and not necessarily according to a schedule dictated by automatic renewal. In some embodiments, a client may repeat the manual or forced renewal process an arbitrary number of times while testing and potentially altering the client-specific export and binding logic each time until the logic is performing as expected.

As illustrated in FIG. 1, the client 170 may initiate the forced certificate renewal by sending a renewal request 111 to the system 100. The system 100 may offer a client interface 110 that receives such requests. The client interface 110 may permit the client 170 to request that the system 100 perform one or more operations, e.g., as associated with forced certificate renewal. In one embodiment, the client interface 110 may represent one or more application programming interfaces (APIs). In one embodiment, the client interface 110 may represent a command-line interface (CLI). In one embodiment, the client interface 110 may represent a console or other graphical user interface (GUI) that can be displayed on a display device associated with the client 170. The console may be built on the one or more APIs. For example, to submit the renewal request 111, a user may push a "force certificate renewal" button or select a similar interface element in a graphical user interface provided by the system 100. The renewal request 111 may include a certificate identifier of the digital certificate to be renewed. The renewal request 111 may include or be associated with access credentials of the client 170. In various embodiments, the renewal request 111 may be acted upon without delay or according to a schedule or arbitrary client-specified date or time submitted with the request. For example, the request 111 may indicate that the renewal should be initiated at 2 AM of the next day and not at the current time in order to minimize disruption of availability of the computing resource 180.

In various embodiments, to perform the forced certificate renewal 120, the system 100 may perform a variety of steps to generate a renewed version of the old digital certificate. The system 100 may launch a workflow to perform the renewal 120. The system 100 may perform key pair generation 130 to generate a public key and a private key associated with the renewed certificate. The system 100 may perform signing request generation 140. The system may send data such as the signing request, public key, and identity of the certificate owner to the certificate authority 160 via a certificate authority interface 150. In various embodiments, the certificate authority 160 may be part of the certificate management system 100 or external to the system. Based (at least in part) on the signing request and other data received with the request, the certificate authority 160 may verify the identity of the requesting entity and perform signed certificate generation 165 to sign a renewed certificate 119. The renewed certificate 119 may be associated with a new expiration date and a new key pair (as generated by the component 130). The renewed certificate 119 may be associated with a domain name, server name, and/or identity of the certificate owner.

Via the interface 150, the system 100 may receive the renewed certificate 119 from the certificate authority. The renewed certificate 119 may be stored indefinitely by the certificate management system 100. The renewed certificate 119 may be stored with a new automatic renewal date that replaces the earlier automatic renewal date, e.g., in a repository of certificates maintained by the system 100. Via the interface 110, the system 100 may provide the renewed certificate 119 to the client 170. The system 100 may also provide other information, such as the private key, to the client. In one embodiment, the client 170 may use an API or other programmatic interface to request the status of the certificate and/or its renewal, and a response to that status request by the system 100 may indicate whether the renewal succeeded or failed. The status of the renewal and/or details of the renewed certificate may be presented in a console or other GUI associated with the system 100. The client 170 may export the renewed certificate (and the private key) from the system 100, e.g., using the client interface 110. The client 170 may bind the renewed certificate 119 to the computing resource 180 to enable clients of that resource to establish secure connections using the new key pair associated with the renewed certificate. By renewing the digital certificate at an arbitrary or client-selected date prior to the automatic renewal date, the system 100 may permit the client 170 to test, debug, and potentially improve client-based program code for processing the renewed certificate (e.g., code for receiving notifications, exporting the certificate, and/or binding the certificate) during an opportune window of time. By renewing the digital certificate at an arbitrary or client-selected date prior to the automatic renewal date, the system 100 may permit the client 170 to verify the expected operation of the client-based program code. Additionally, by renewing the digital certificate at an arbitrary or client-selected date prior to the automatic renewal date, the system 100 may permit the client 170 to minimize any disruption (e.g., to access by clients to the resource 180) associated with automatic renewal.

It is contemplated that the system 100 may include additional components not shown, fewer components than shown, or different combinations, configurations, or quantities of the components shown. The system 100 may comprise one or more computing devices, any of which may be implemented by the example computing device 800 illustrated in FIG. 8. In various embodiments, portions of the system 100 may be provided by the same computing device or by any suitable number of different computing devices. If any of the components of the system 100 are implemented using different computing devices, then the components and their respective computing devices may be communicatively coupled, e.g., via a network. Each of the illustrated components may represent any combination of software and hardware usable to perform their respective functions. It is contemplated that the system 100 may be invoked to perform resiliency testing based (at least in part) on initial user input, e.g., through a user interface or API. However, beyond the invocation of the system 100, aspects of the functionality of the system may be performed in an automated manner without soliciting input from a user associated with the system architecture under analysis.

The client 170 may represent one or more processes, systems, and/or computing devices. The client 170 may be distributed across multiple computing devices throughout one or more networks, including private networks and/or public networks such as the Internet. The client 170 may also be coupled to the system 100 through one or more networks, including private networks and/or public networks such as the Internet. The 170 may interact with the system 100 using one or more suitable interfaces, such as one or more application programming interfaces (APIs), e.g., to invoke the functionality of the system 100 for forced certificate renewal.

Figure 2:
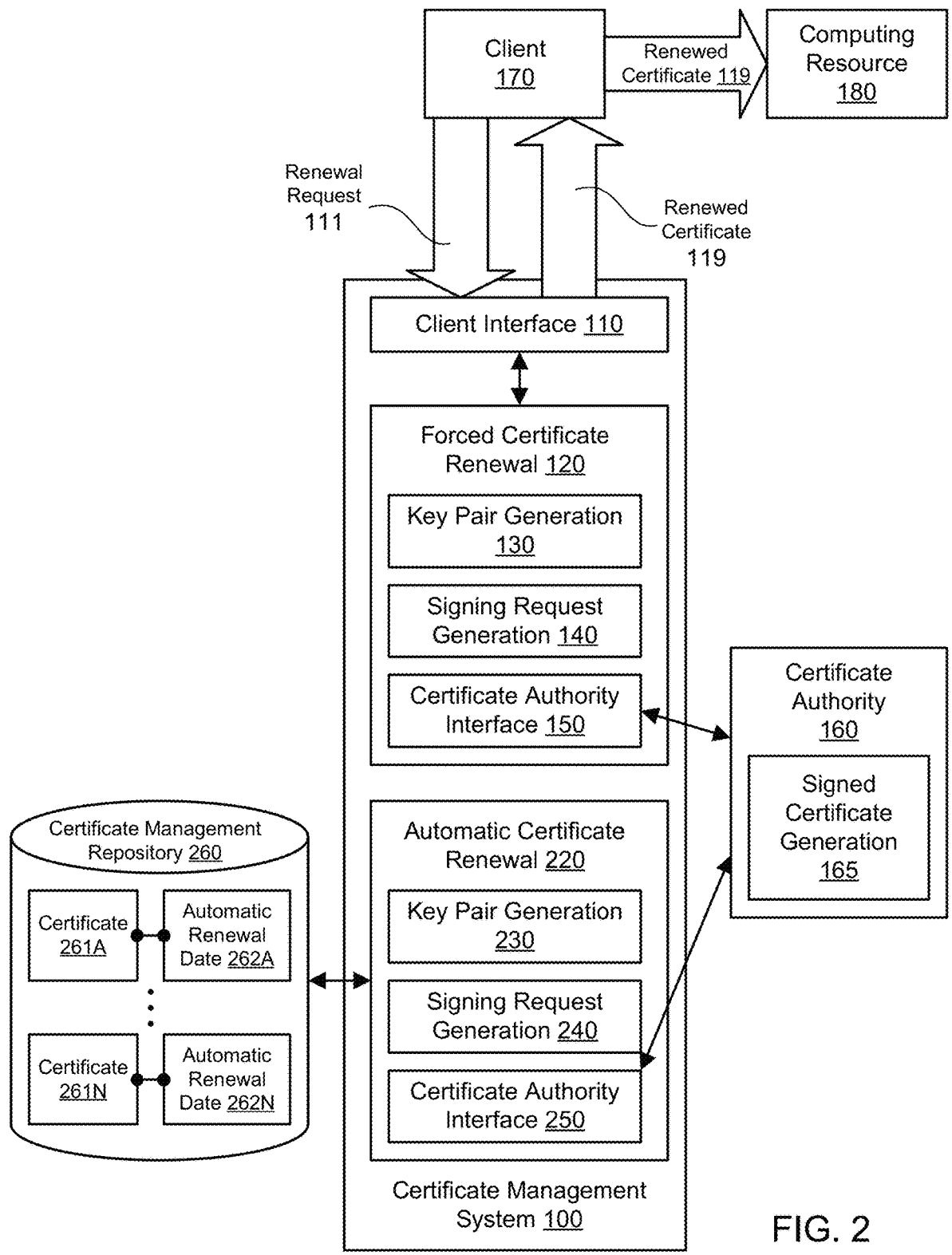
FIG. 2 illustrates further aspects of the example system environment for a certificate management system with forced certificate renewal, including automatic certificate renewal using the same certificate management system, according to some embodiments.

FIG. 2 illustrates further aspects of the example system environment for a certificate management system with forced certificate renewal, including automatic certificate renewal using the same certificate management system, according to some embodiments. In some embodiments, the certificate management system 100 may offer both forced (manual) certificate renewal 120 and automatic certificate renewal 220. The automatic certificate renewal 220 may implement key pair generation 230 similar to or the same as key pair generation 130, signing request generation 240 similar to or the same as signing request generation 140, and a certificate authority interface 250 similar to or the same as the certificate authority interface 150. However, the components 230, 240, and 250 may be performed according to automatic renewal dates associated with digital certificates. As shown in the example of FIG. 2, the system 100 may include or have access to a certificate management repository 260. The repository 260 may represent internal storage associated with the system 100 or may instead be implemented using a network-accessible storage service. The repository 260 may store data or metadata associated with digital certificates. For example, the repository 260 may store certificate identifiers, ownership information, key pairs, identifiers of certificate authorities, and/or other suitable information for a set of certificates 261A-261N. The repository may also store an automatic renewal date for each certificate, such as automatic renewal date 262A for certificate 261A and automatic renewal date 262N for certificate 261N. An automatic renewal date may be a date prior to the expiration of the corresponding certificate. For example, the automatic renewal date may be eleven months after issuance of the certificate.

The automatic certificate renewal 220 may monitor the automatic renewal dates 262A-262N. In one embodiment, when one of the automatic renewal dates is approaching, the automatic certificate renewal 220 may initiate the key pair generation 230 and signing request generation 240 in order to acquire a renewed certificate 119 from the certificate authority. In one embodiment, at a fixed time prior to an automatic renewal date, the automatic certificate renewal 220 may initiate the key pair generation 230 and signing request generation 240 in order to acquire a renewed certificate 119 from the certificate authority. The automatic certificate renewal 220 may be implemented using similar techniques as the forced certificate renewal 120, except the automatic certificate renewal 220 may be performed automatically according to a schedule and not at an arbitrary date specified by the client 170. In one embodiment, using the same certificate management system 100, the client 170 may choose to allow the automatic certificate renewal 220 to be performed according to the automatic renewal date or may instead choose the forced certificate renewal 120 at a client-specified date. By instead submitting a request 111 that triggers the forced renewal 120, the client 170 may bypass the planned automatic renewal 220. Whether the renewal is automatic or manual, the renewed certificate 119 may be stored with a new automatic renewal date that replaces the earlier automatic renewal date in the repository 260.

Figure 3:
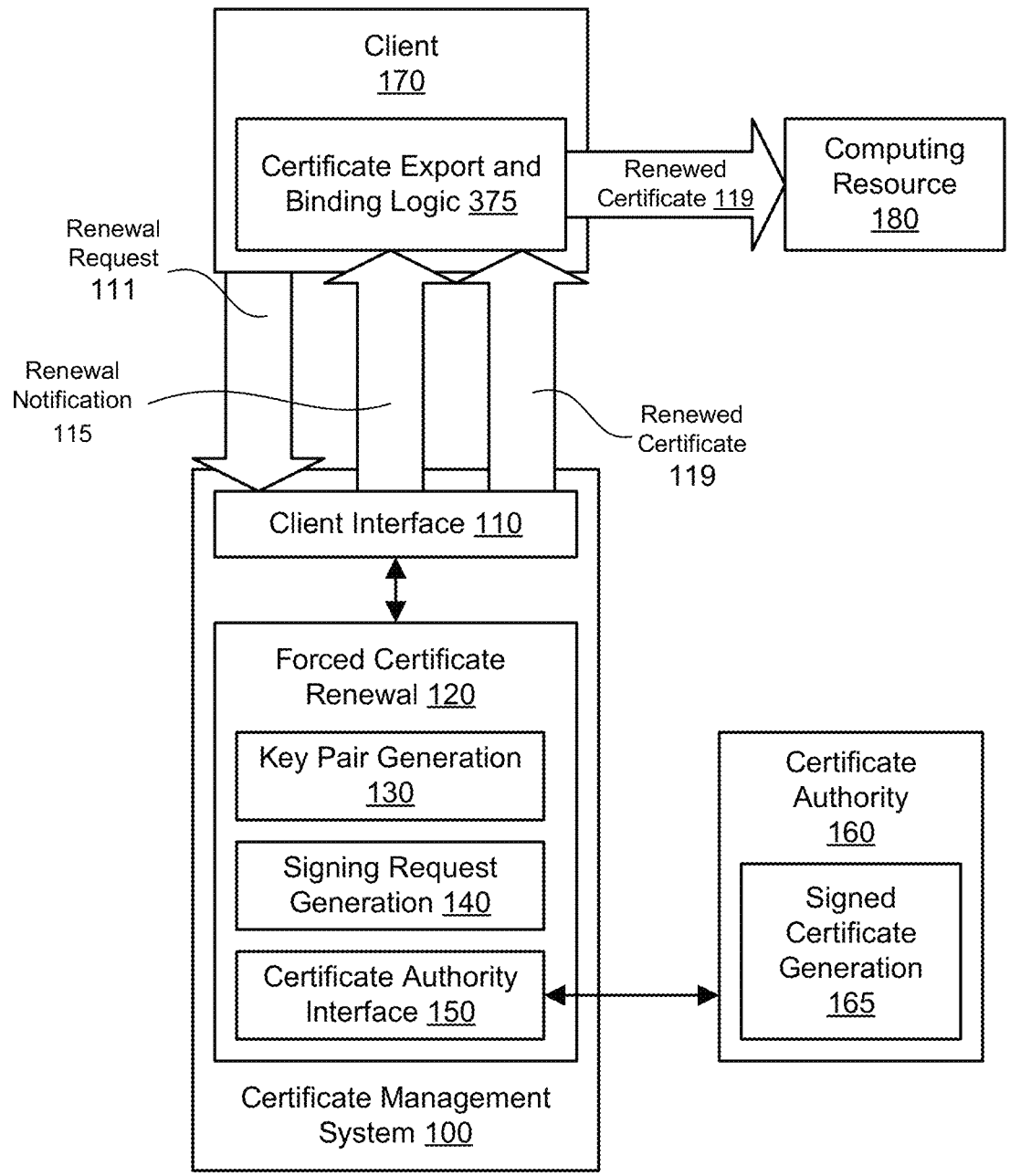
FIG. 3 illustrates further aspects of the example system environment for a certificate management system with forced certificate renewal, including the use of forced certificate renewal to test client logic for exporting and binding a renewed certificate, according to some embodiments.

FIG. 3 illustrates further aspects of the example system environment for a certificate management system with forced certificate renewal, including the use of forced certificate renewal to test client logic for exporting and binding a renewed certificate, according to some embodiments. The client 170 may have client-side program code (logic) 375 executable to perform aspects of the certificate export and binding described above. However, automatic, deadline-based renewal techniques may not yield sufficient time for testing the client-based export and binding logic. Using the forced certificate renewal 120, the client 170 may acquire the renewed certificate 119 at a client-specified date and not at the automatic renewal date associated with the certificate. The client 170 may invoke the forced certificate renewal 120 in order to test the certificate export and binding logic 375, e.g., to verify that the logic is operating as expected. In one embodiment, when the system 100 acquires the renewed certificate 119 from the certificate authority 160, the system 100 may generate (or cause to be generated) a notification 115 of the renewal. In one embodiment, the notification 115 may indicate a successful renewal of an identified certificate.

The client-side logic 375 may be executable to receive the notification 115 and, in response, export the renewed certificate 119 from the system 100 and bind the renewed certificate 119 to the computing resource 180. In one embodiment, the client-side logic 375 may be executed (at least in part) on the resource 180 itself. As discussed above, the client 170 may bind the renewed certificate 119 to the computing resource 180 to enable clients of that resource to establish secure connections using the new key pair associated with the renewed certificate. By renewing the digital certificate at an arbitrary or client-selected date prior to the automatic renewal date, the system 100 may permit the client 170 to test or verify the operation of client-based program code 375 for processing the renewed certificate (e.g., code for receiving notifications, exporting the certificate, and/or binding the certificate) during an opportune window of time. If the client-side logic 375 is found to be faulty or otherwise operating in an unexpected manner, the client 170 may then have sufficient time prior to an automatic certificate renewal to correct any flaws in the logic. In some embodiments, the client may repeat the manual renewal process an arbitrary number of times until the client-side logic 375 is operating as expected.

Figure 4:
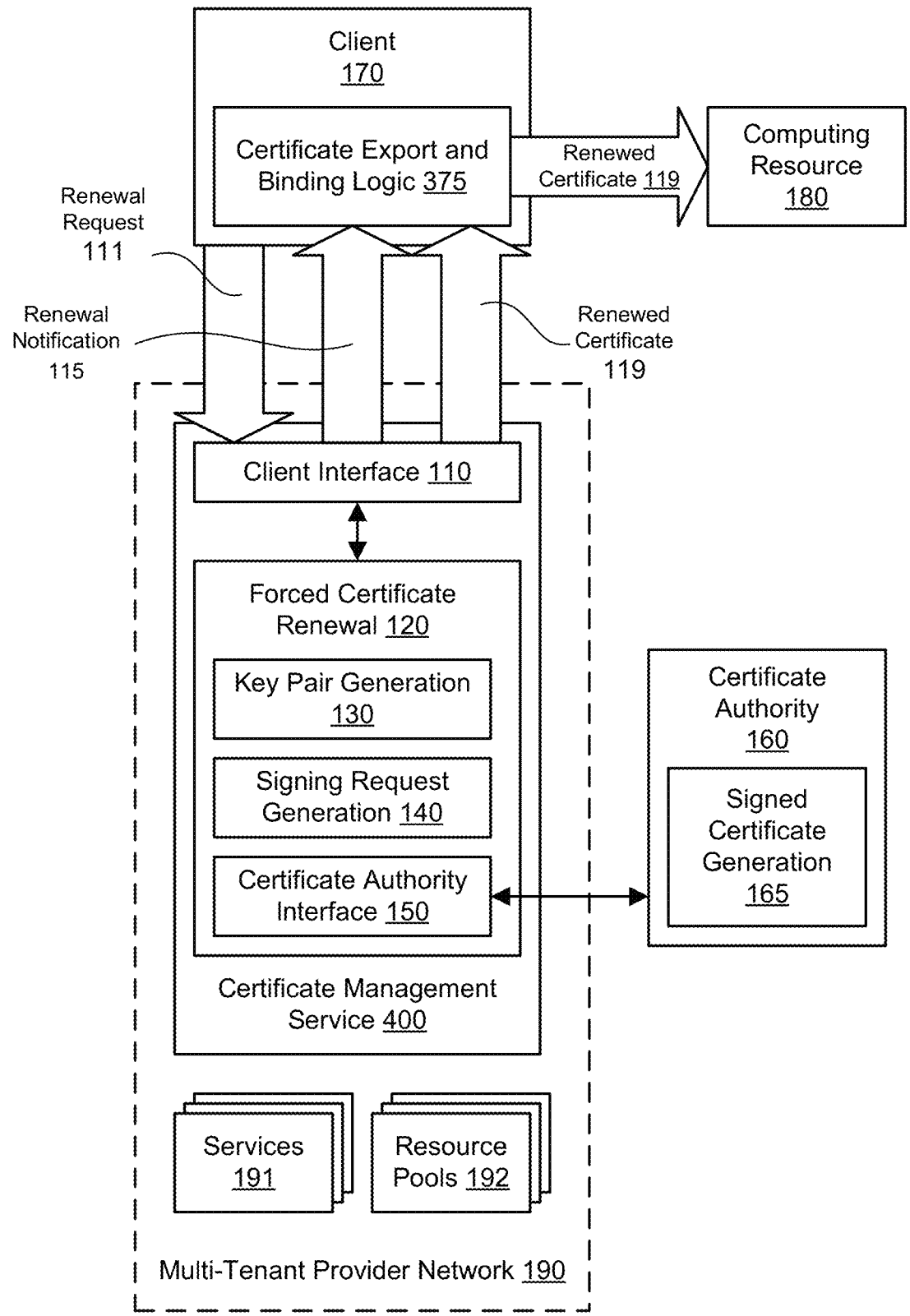
FIG. 4 illustrates further aspects of the example system environment for a certificate management system with forced certificate renewal, including a multi-tenant provider network that implements forced certificate renewal using a certificate management service, according to some embodiments.

FIG. 4 illustrates further aspects of the example system environment for a certificate management system with forced certificate renewal, including a multi-tenant provider network that implements forced certificate renewal using a certificate management service, according to some embodiments. In one embodiment, the functionality of the system 100 as discussed above may be provided to clients as a certificate management service 400. The service 400 may be web-accessible and may be hosted in a multi-tenant provider network 190. The service 400 or system 100 may assess fees to clients for certificate issuance, certificate renewal, certificate export, and/or other certificate management tasks. In some embodiments, the client 170 and/or its computing resource 180 may be external to the provider network 190, e.g., on client-managed premises. The provider network 190 may represent a network operated by an entity such as a business or a public-sector organization to provide one or more services and other computing resources (such as various types of cloud-based computing or storage) accessible via the Internet and/or other networks to a distributed set of clients. The provider network 190 may include numerous data centers hosting various services 191 and resource pools 192 of computing resources, such as collections of physical and/or virtualized computer servers, storage devices, networking equipment and the like, that are used to implement and distribute the infrastructure and services offered by the provider. The provider network 190 may offer some resource pools and services to multiple clients simultaneously and may thus be termed "multi-tenant."

The computing resources 192 may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). The provider network 190 may offer a set of services 191 whose functionality can be invoked by clients internal or external to the provider network. For example, the service 191 may include "serverless" computing solutions that allocate and manage servers and hosts on behalf of clients. A number of different types of computing devices may be used singly or in combination to implement the resources of the provider network 190 in different embodiments, including general purpose or special purpose computer servers, storage devices, network devices, and so on.

Figure 5:
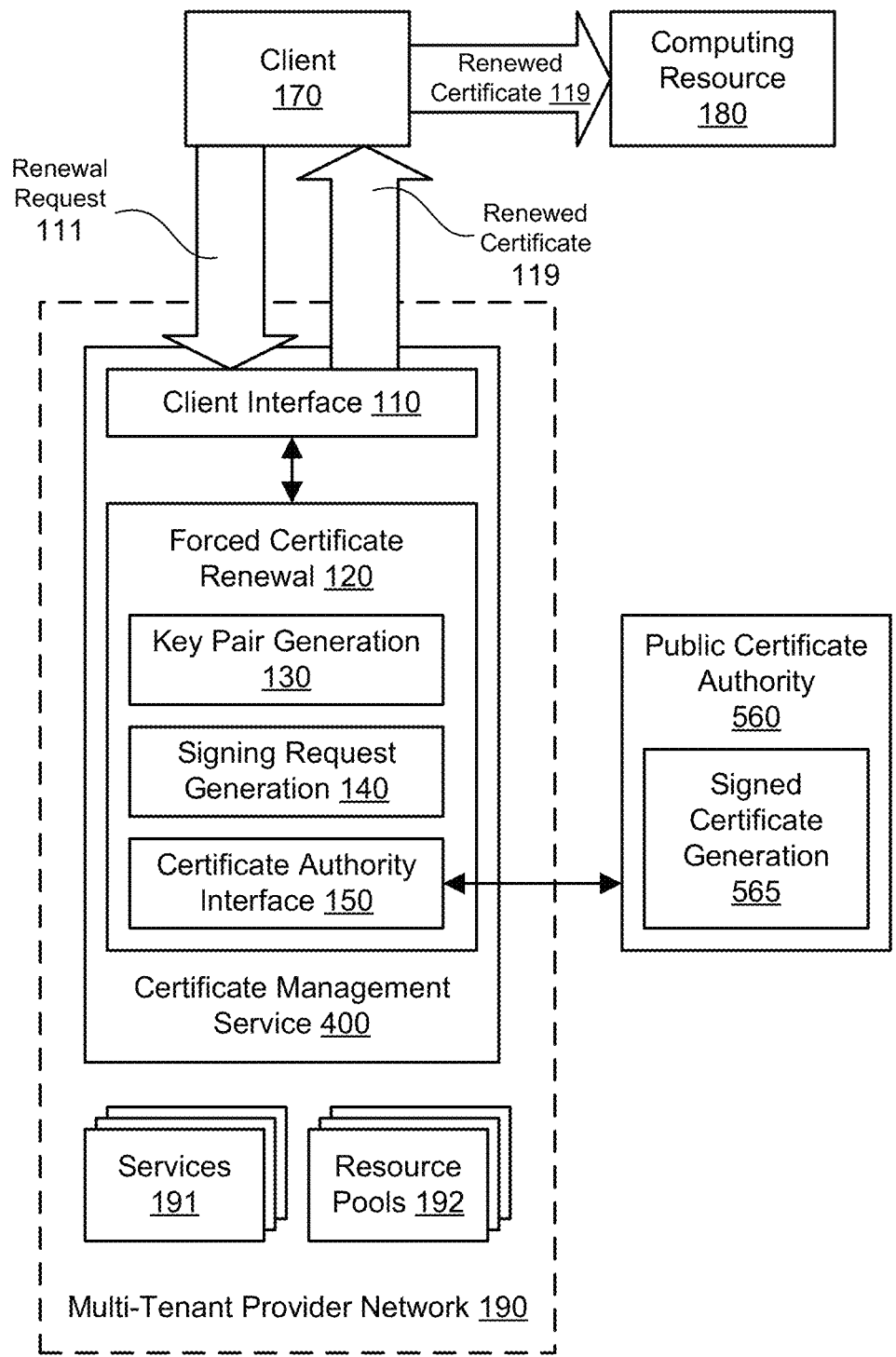
FIG. 5 illustrates further aspects of the example system environment for a certificate management system with forced certificate renewal, including the use of a public certificate authority for forced certificate renewal, according to some embodiments.

FIG. 5 illustrates further aspects of the example system environment for a certificate management system with forced certificate renewal, including the use of a public certificate authority for forced certificate renewal, according to some embodiments. In one embodiment, the certificate authority 160 may represent a public certificate authority 560. The public certificate authority 560 may perform signed certificate generation 565 and issue a signed digital certificate to a variety of clients based on a fee and submission of proof of identity. The public certificate authority 560 may be external to the provider network 190.

Figure 6:
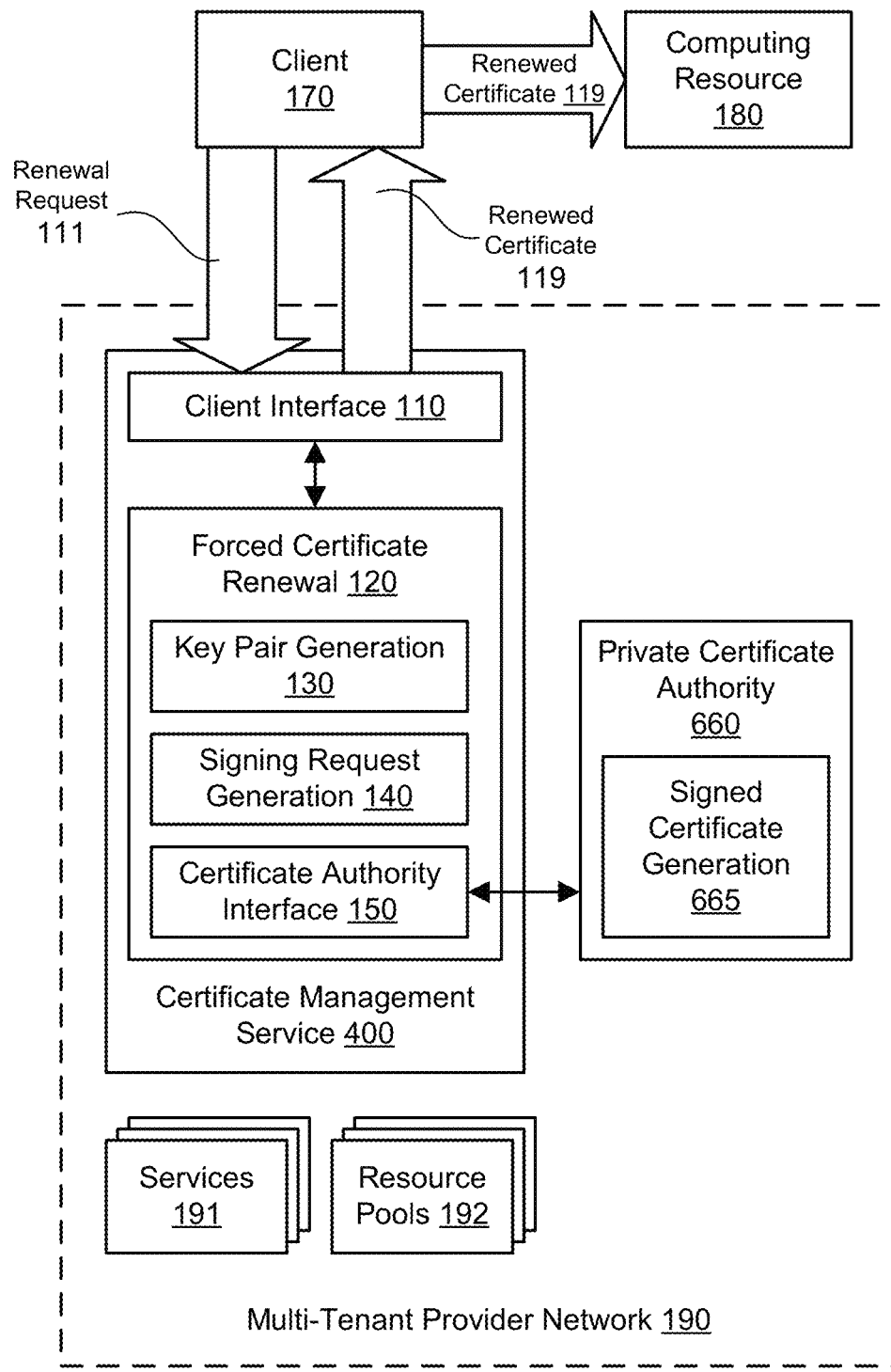
FIG. 6 illustrates further aspects of the example system environment for a certificate management system with forced certificate renewal, including the use of a private certificate authority for forced certificate renewal, according to some embodiments.

FIG. 6 illustrates further aspects of the example system environment for a certificate management system with forced certificate renewal, including the use of a private certificate authority for forced certificate renewal, according to some embodiments. In one embodiment, the certificate authority 160 may represent a private certificate authority 660. The private certificate authority 660 may be internal to the provider network 190 or otherwise associated with the same business entity that operates the provider network. The private certificate authority 160 may be part of the certificate management system 100 or external to the system, as illustrated in FIG. 6. The private certificate authority 660 may perform signed certificate generation 665 and issue a signed digital certificate to users or divisions associated with the provider network 190. In one embodiment, the private certificate authority 660 may issue digital certificates to external clients of the provider network 190, such as client 170. In one embodiment, the private certificate authority 660 may issue digital certificates to internal clients of the provider network 190, such as users or divisions that operate web servers, application servers, and other computing resources among the services 191 and/or resource pools 192 of the provider network.

Figure 7:
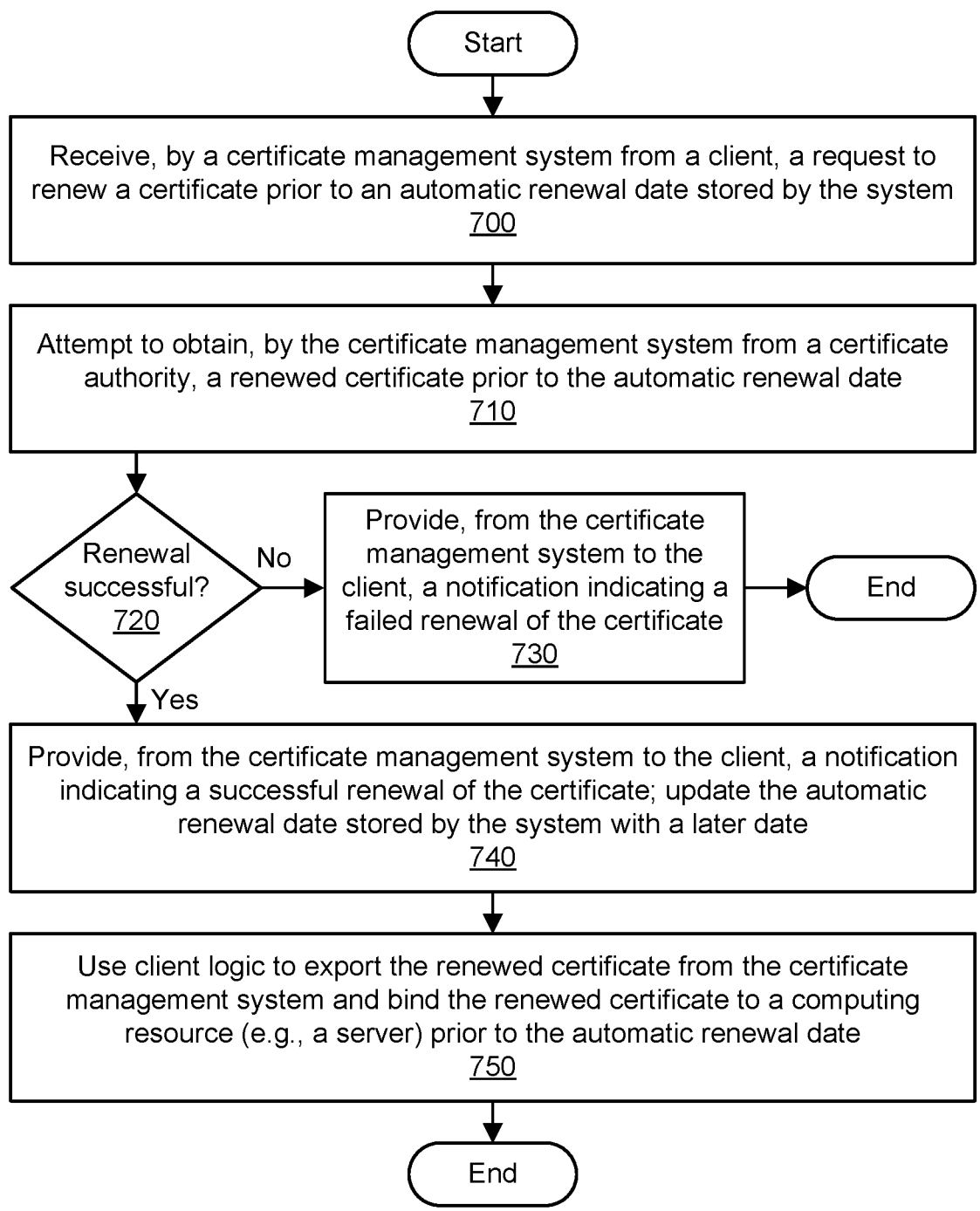
FIG. 7 is a flowchart illustrating a method for using a certificate management system to perform forced certificate renewal, according to some embodiments.

FIG. 7 is a flowchart illustrating a method for using a certificate management system to perform forced certificate renewal, according to some embodiments. As shown in 700, a certificate management system may receive, from a client of the system, a request to renew a digital certificate. The request may be received prior to an automatic renewal date associated with the certificate. The request may represent a request to force renewal of the certificate immediately (or without delay) or instead at an arbitrary, client-specified time that may be prior to the automatic renewal date. The certificate management system may store the automatic renewal date in a certificate management repository, and the automatic renewal may be performed as scheduled at the automatic renewal date if the request to renew at the arbitrary or client-specified date is not received by the system. The current certificate may be associated with (e.g., bound to) a computing resource such as a server, a web server, an application server, or other network-accessible or web-accessible computing entity. The computing resource may be owned and/or operated by the client that requests renewal.

As shown in 710, the certificate management system may attempt to obtain, from a certificate authority, a renewed certificate prior to the automatic renewal date, thereby bypassing the automatic renewal. The certificate authority may represent a trusted third party. A digital certificate issued by the certificate authority may certify to clients of a server or computing resource that a named subject of the certificate (e.g., the operator or the server or resource) has ownership of a public key. The certificate authority from which renewal is sought may be the same certificate authority that issued the current, unexpired certificate. In attempting to obtain the renewal, the certificate management system may generate a public key, a private key, and a signing request to be provided to the certificate authority. As shown in 720, the method may determine whether the renewal was successful. The request to the certificate authority may be denied, for example, if the correct fee was not paid (e.g., to the certificate authority) or if the certificate authority could not verify the identity of the client on whose behalf the renewal is sought. In one embodiment, the renewal request may be denied by the certificate management system or the certificate authority if the certificate management system did not acquire appropriate permissions to access the certificate authority on behalf of the client.

As shown in 730, if the renewal attempt failed, then the certificate management system may provide, to the client, a notification indicating the failed renewal of the certificate. The notification may be provided through an external notification service that sends notifications from a plurality of entities to a plurality of clients. The notification may be provided via an API associated with the certificate management system. The notification may be provided by displaying data in a graphical user interface associated with the certificate management system. The failed renewal may not preclude another attempt at manual (forced) renewal or automatic certificate renewal according to the automatic renewal date. In one embodiment, the notification may be provided to the client in response to a status request from the client regarding the certificate renewal.

As shown in 740, if the renewal attempt succeeded, then the certificate management system may provide, to the client, a notification indicating the successful renewal of the certificate. The notification may be provided through an external notification service that sends notifications from a plurality of entities to a plurality of clients. The notification may be provided via an API associated with the certificate management system. The notification may be provided by displaying data in a graphical user interface associated with the certificate management system. In one embodiment, the notification may be provided to the client in response to a status request from the client regarding the certificate renewal. The renewed certificate may be stored with a new automatic renewal date that replaces the earlier automatic renewal date, e.g., in a repository of certificates maintained by the certificate management system. The certificate management system may again attempt automatic renewal of the certificate at the new automatic renewal date if the client does not trigger another manual renewal prior to that date.

As shown in 750, the client may perform one or more tasks in response to receipt of the notification of successful renewal. The client may have client-side program code (logic) executable to perform aspects of certificate export and binding. The client-side logic may be executable to receive the notification and, in response, export the renewed certificate from the certificate management system and bind the renewed certificate to the client's server or other computing resource. As discussed above, the client may bind the renewed certificate to the server or computing resource to enable clients of that server or resource to establish secure connections using the new key pair associated with the renewed certificate. In one embodiment, the client-side logic may be executed (at least in part) on the server of computing resource to which the renewed certificate is exported and bound. By renewing the digital certificate at an arbitrary or client-selected date prior to the automatic renewal date, the certificate management system may permit the client to test and/or verify the operation of client-based program code for processing the renewed certificate (e.g., code for receiving notifications, exporting the certificate, and/or binding the certificate) during an opportune window of time. If the client-side logic is found to be faulty or otherwise operating in an unexpected manner, the client may then have sufficient time prior to an automatic certificate renewal to correct any flaws in the logic. In some embodiments, the client may repeat the manual renewal process an arbitrary number of times until the client-side logic is operating as expected.

Illustrative Computer System

Figure 8:
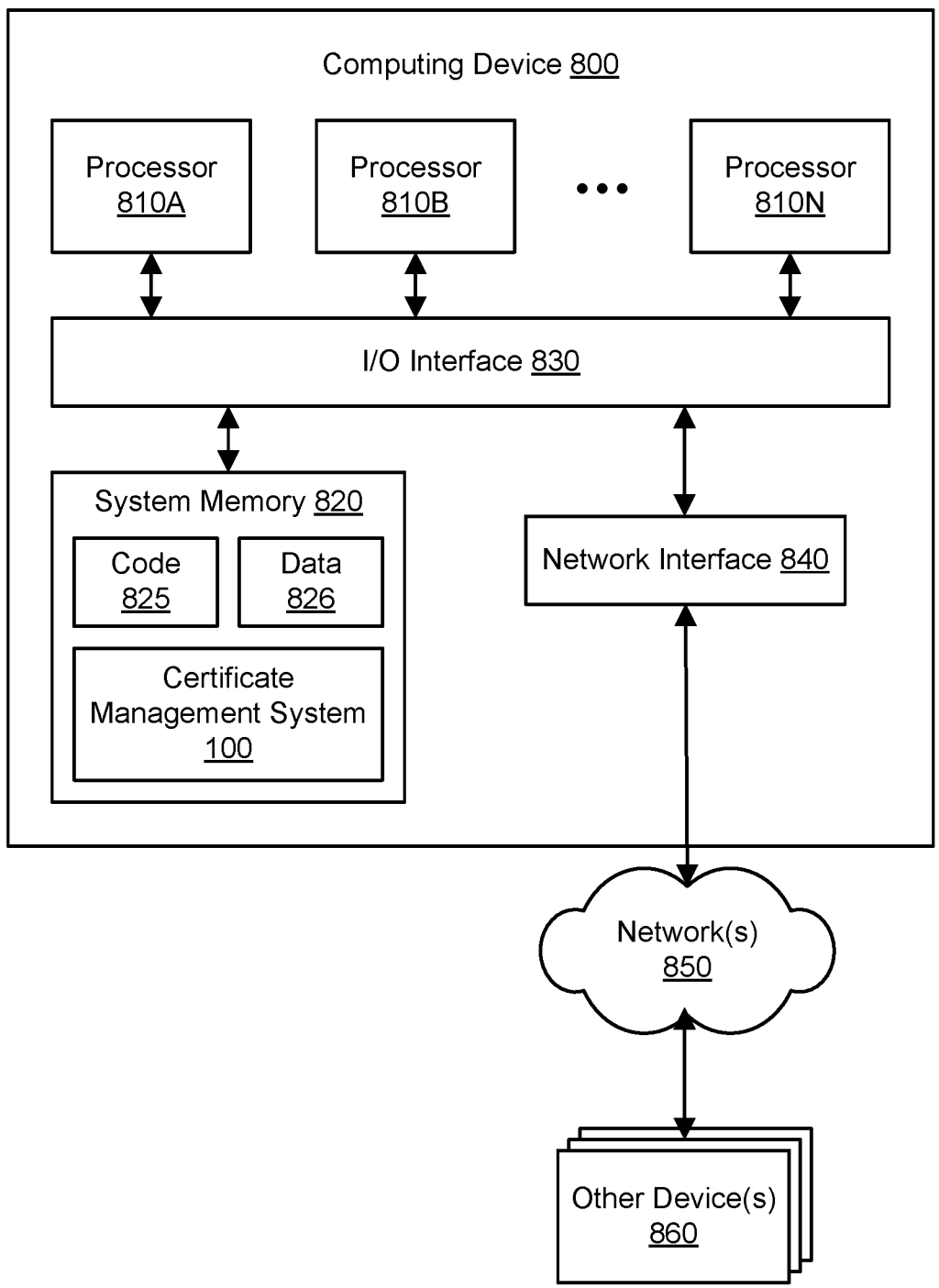
FIG. 8 illustrates an example computing device that may be used in some embodiments.

In at least some embodiments, a computer system that implements a portion or all of one or more of the technologies described herein may include a computer system that includes or is configured to access one or more computer-readable media. FIG. 8 illustrates such a computing device 800, according to some embodiments. In the illustrated embodiment, computing device 800 includes one or more processors 810A-810N coupled to a system memory 820 via an input/output (I/O) interface 830. In one embodiment, computing device 800 further includes a network interface 840 coupled to I/O interface 830.

In various embodiments, computing device 800 may be a uniprocessor system including one processor or a multiprocessor system including several processors 810A-810N (e.g., two, four, eight, or another suitable number). In one embodiment, processors 810A-810N may include any suitable processors capable of executing instructions. For example, in various embodiments, processors 810A-810N may be processors implementing any of a variety of instruction set architectures (ISAs), such as the x86, PowerPC, SPARC, or MIPS ISAs, or any other suitable ISA. In one embodiment, in multiprocessor systems, each of processors 810A-810N may commonly, but not necessarily, implement the same ISA.

In one embodiment, system memory 820 may be configured to store program instructions and data accessible by processor(s) 810A-810N. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 820 as code (i.e., program instructions) 825 and data 826. In one embodiment, the memory 820 may store program instructions for implementing at least some aspects of the certificate management system 100.

In one embodiment, I/O interface 830 may be configured to coordinate I/O traffic between processors 810A-810N, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processors 810A-810N). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. In some embodiments, some or all of the functionality of I/O interface 830, such as an interface to system memory 820, may be incorporated directly into processors 810A-810N.

In one embodiment, network interface 840 may be configured to allow data to be exchanged between computing device 800 and other devices 860 attached to a network or networks 850. In various embodiments, network interface 840 may support communication via any suitable wired or wireless general data networks, such as types of Ethernet network, for example. Additionally, in some embodiments, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 800 via I/O interface 830. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 800 as system memory 820 or another type of memory. In one embodiment, a computer-readable medium may include transmission media or signals such as electrical, electromagnetic, or digital signals, conveyed via a communication medium such as a network and/or a wireless link, such as may be implemented via network interface 840. The described functionality may be implemented using one or more non-transitory computer-readable storage media storing program instructions that are executed on or across one or more processors. Portions or all of multiple computing devices such as that illustrated in FIG. 8 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more processors and one or more memories to store computer-executable instructions that, if executed, cause the one or more processors to implement a certificate management system on a service provider network that provides compute and storage services for clients external to the service provider network, the certificate management system distinct from a certificate authority, the certificate management system to:
store, on behalf of the clients, automatic renewal dates for automatic renewals of certificates;
provide, to clients, a client-facing interface for receiving requests from the clients to force renewals of certificates prior to the stored automatic renewal dates of the certificates, wherein forcing renewal of a certificate bypasses the automatic renewal according to the stored automatic renewal date;
prior to the automatic renewal date for a first of the certificates,
receive, from a client via the client-facing interface of the certificate management system, a request to force renewal of the first certificate prior to the automatic renewal date of the first certificate, wherein the request to force renewal indicates when to force the renewal of the first certificate;
obtain, based at least in part on the request that indicates when to force renewal of the first certificate, a renewed certificate from the certificate authority distinct from the certificate management system, wherein the renewed certificate is obtained from the certificate authority prior to when the renewed certificate would have been obtained based on the automatic renewal date of the first certificate, bypassing the automatic renewal for the first certificate to happen prior to the stored automatic renewal date of the first certificate; and send, to the client, a notification of the renewed certificate, wherein the renewed certificate is exported from the certificate management system prior to the automatic renewal date for the first certificate based at least in part on the notification, and wherein the renewed certificate is bound to an application server prior to the automatic renewal date for the first certificate using program code operated by the client.

2. The system as recited in claim 1, wherein the computer-executable instructions, if executed, further cause the one or more processors to:

store a new automatic renewal date for the renewed certificate, wherein the new automatic renewal date replaces the automatic renewal date for the first certificate, and wherein the new automatic renewal date is later than the automatic renewal date for the first certificate.

3. The system as recited in claim 1, wherein the certificate management system is implemented in a cloud-based, multi-tenant provider network, and wherein the application server is external to the cloud-based, multi-tenant provider network.

4. A method, comprising:

storing, by a certificate management system on a service provider network that provides compute and storage services to clients external to the service provider network, automatic renewal dates for automatic renewals of certificates;

providing, by the certificate management system, a client-facing interface for receiving, from the clients external to the service provider network, requests to force renewals, at client-selected times prior to the stored automatic renewal dates, of the certificates, wherein force renewal of a certificate bypasses the automatic renewal according to the stored automatic renewal date;

prior to the automatic renewal date for a first of the certificates, receiving, via the client interface provided by the certificate management system, a request from a client to force renewal of the first certificate prior to the automatic renewal date of the first certificate, wherein the request to force renewal indicates when to force the renewal of the first certificate; and acquiring, by the certificate management system based at least in part on the request that indicates when to force renewal of the first certificate, a renewed certificate generated by a certificate authority distinct from the certificate management system, wherein the renewed certificate is obtained from the certificate authority prior to when the renewed certificate would have been obtained based on the automatic renewal date of the first certificate, bypassing the automatic renewal for the first certificate to happen prior to the stored automatic renewal date of the first certificate; and wherein the renewed certificate is exported from the certificate management system and bound to a computing resource prior to the automatic renewal date of the first certificate in accordance with the request to force renewal of the first certificate.

5. The method as recited in claim 4, wherein the renewed certificate is exported from the certificate management system and bound to the computing resource using program code associated with the client.

6. The method as recited in claim 5, wherein operation of the program code is verified prior to the automatic renewal date by exporting the renewed certificate from the certificate management system and binding the renewed certificate to the computing resource.

7. The method as recited in claim 4, wherein the method further comprises:

sending, by the certificate management system to the client, a notification of the renewed certificate, wherein the renewed certificate is exported from the certificate management system and bound to the computing resource based at least in part on the notification.

8. The method as recited in claim 4, wherein the method further comprises:

receiving, by the certificate management system from the client, a status request associated with the first certificate via an application programming interface (API); and sending, by the certificate management system to the client, a renewal status of the first certificate.

9. The method as recited in claim 4, wherein the certificate authority represents a public certificate authority.

10. The method as recited in claim 4, wherein the certificate authority represents a private certificate authority.

11. The method as recited in claim 4, wherein the certificate management system is implemented in a cloud-based, multi-tenant provider network, and wherein the computing resource is external to the cloud-based, multi-tenant provider network.

12. One or more non-transitory computer-readable storage media storing program instructions that, when executed on or across one or more processors, perform:

storing, by a certificate management system on a service provider network that provides compute and storage services for clients external to the service provider network, automatic renewal dates for automatic renewals of certificates;

providing, by the certificate management system, a client-facing interface for receiving requests from clients to force renewals, at client-selected times prior to the stored automatic renewal dates, of the certificates, wherein force renewal of a certificate bypasses the automatic renewal according to the stored automatic renewal date;

prior to the automatic renewal date for a first of the certificates, receiving from a client, via the client interface of the certificate management system, a request to force renewal of the first certificate prior to the automatic renewal date of the first certificate, wherein the request to force renewal indicates when to force the renewal of the first certificate; and obtaining, by the certificate management system based at least in part on the request that indicates when to force renewal of the first certificate, a renewed certificate from a certificate authority distinct from the certificate management system, wherein the renewed certificate is obtained from the certificate authority prior to when the renewed certificate would have been obtained based on the automatic renewal date of the first certificate, bypassing the automatic renewal for the first certificate to happen prior to the stored automatic renewal data of the first certificate; and wherein the renewed certificate is exported from the certificate management system and bound to a server by the client prior to the automatic renewal date of the first certificate in accordance with the request to force renewal of the first certificate.

13. The one or more non-transitory computer-readable storage media as recited in claim 12, wherein the renewed certificate is exported from the certificate management system and bound to the server using program code executing at least in part on the server.

14. The one or more non-transitory computer-readable storage media as recited in claim 13, wherein operation of the program code is verified by the client prior to the automatic renewal date by exporting the renewed certificate from the certificate management system and binding the renewed certificate to the server.

15. The one or more non-transitory computer-readable storage media as recited in claim 12, further comprising additional program instructions that, when executed on or across the one or more processors, perform:

sending, by the certificate management system to the client, a notification of the renewed certificate, wherein the renewed certificate is exported from the certificate management system and bound to the server based at least in part on the notification.

16. The one or more non-transitory computer-readable storage media as recited in claim 12, further comprising additional program instructions that, when executed on or across the one or more processors, perform:

receiving, by the certificate management system from the client, a status request associated with the first certificate via an application programming interface (API); and sending, by the certificate management system to the client, a renewal status of the first certificate.

17. The one or more non-transitory computer-readable storage media as recited in claim 12, wherein a scheduled automatic renewal of the first certificate at the automatic renewal date is not performed by the certificate management system based at least in part on obtaining the renewed certificate from the certificate authority prior to the automatic renewal date.

18. The one or more non-transitory computer-readable storage media as recited in claim 12, wherein the program instructions, when executed on or across one or more processors, further perform:

storing a new automatic renewal date for the renewed certificate, wherein the new automatic renewal date replaces the automatic renewal date of the first certificate, and wherein the new automatic renewal date is later than the automatic renewal date of the first certificate.

\* \* \* \* \*